United States Patent
McCarville

(10) Patent No.: US 6,367,284 B1
(45) Date of Patent: Apr. 9, 2002

(54) INTAKE COOLER

(76) Inventor: Wendy Rae McCarville, 614 11th Ave., New Hyde Park, NY (US) 11040

( * ) Notice: Subject to any disclaimer, the term of this patent is extended or adjusted under 35 U.S.C. 154(b) by 0 days.

(21) Appl. No.: 09/610,441

(22) Filed: Jul. 3, 2000

Related U.S. Application Data

(60) Provisional application No. 60/141,889, filed on Jul. 2, 1999.

(51) Int. Cl.7 ................................................ F25D 3/08
(52) U.S. Cl. ......................................... 62/530; 123/542
(58) Field of Search ........................ 62/530, 239, 245; 123/542

(56) References Cited

U.S. PATENT DOCUMENTS

| | | | |
|---|---|---|---|
| 2,241,420 A | * | 5/1941 | Pinkel |
| 3,736,769 A | * | 6/1973 | Peterson ...................... 62/530 |
| 4,058,096 A | * | 11/1977 | Brown |
| 4,530,220 A | * | 7/1985 | Nambu et al. ................ 62/530 |
| 4,931,333 A | * | 6/1990 | Henry ....................... 62/530 X |
| 5,072,455 A | * | 12/1991 | St Ours |
| 5,424,519 A | * | 6/1995 | Salee |
| 5,787,505 A | * | 8/1998 | Piwko et al. |

FOREIGN PATENT DOCUMENTS

JP          08027921 A   *   1/1996

* cited by examiner

*Primary Examiner*—Henry Bennett
*Assistant Examiner*—Chen-Wen Jiang
(74) *Attorney, Agent, or Firm*—Welsh & Flaxman LLC

(57) ABSTRACT

An air intake cooling device including a fireproof outer bag, a frozen material contained within the bag and a waterproof material separating the frozen material from the bag. The frozen material being contained within a waterproof receptacle which is removable from the outer bag.

7 Claims, 2 Drawing Sheets

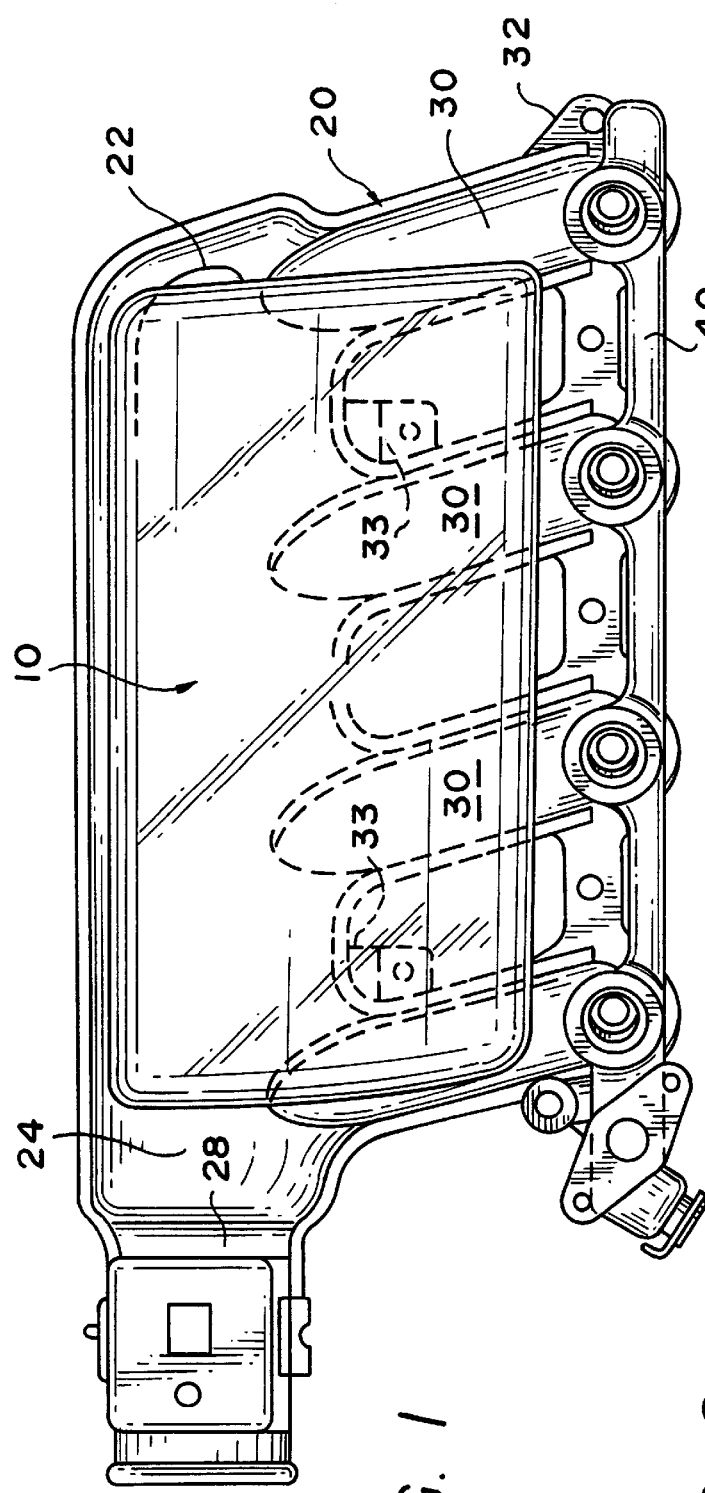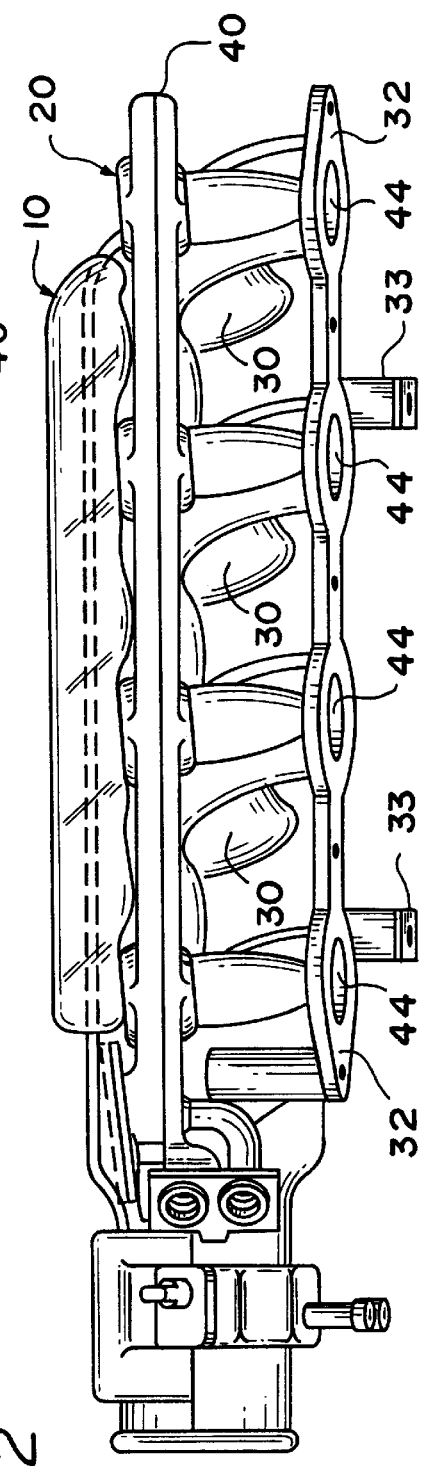

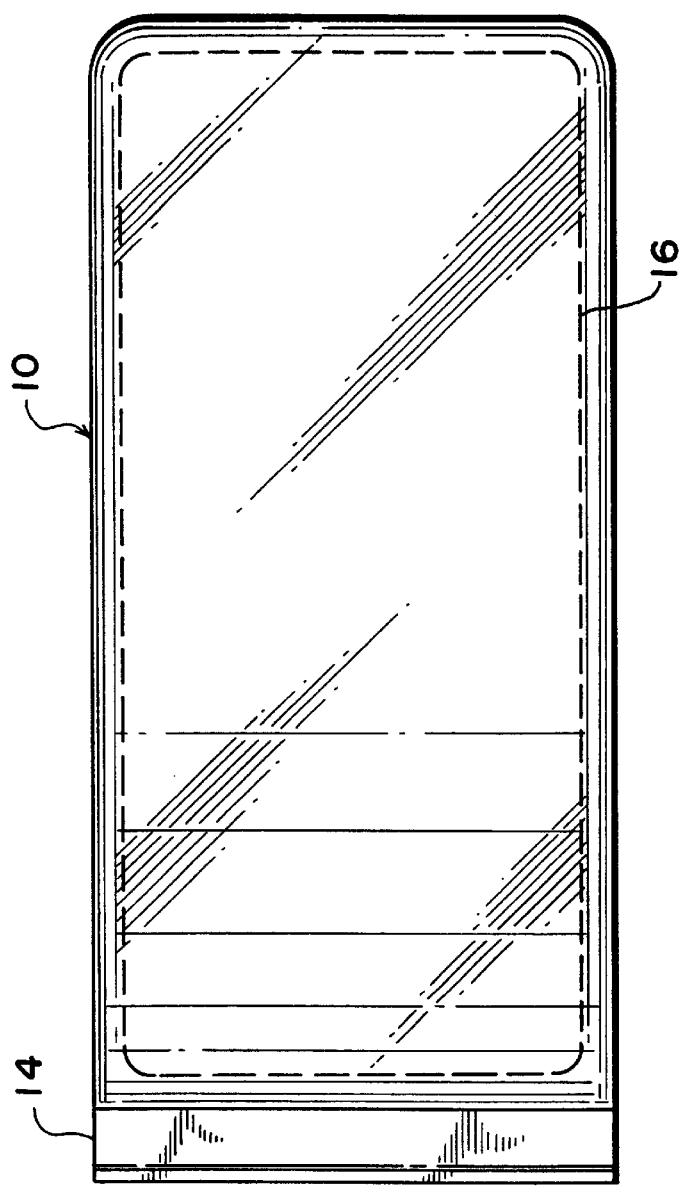
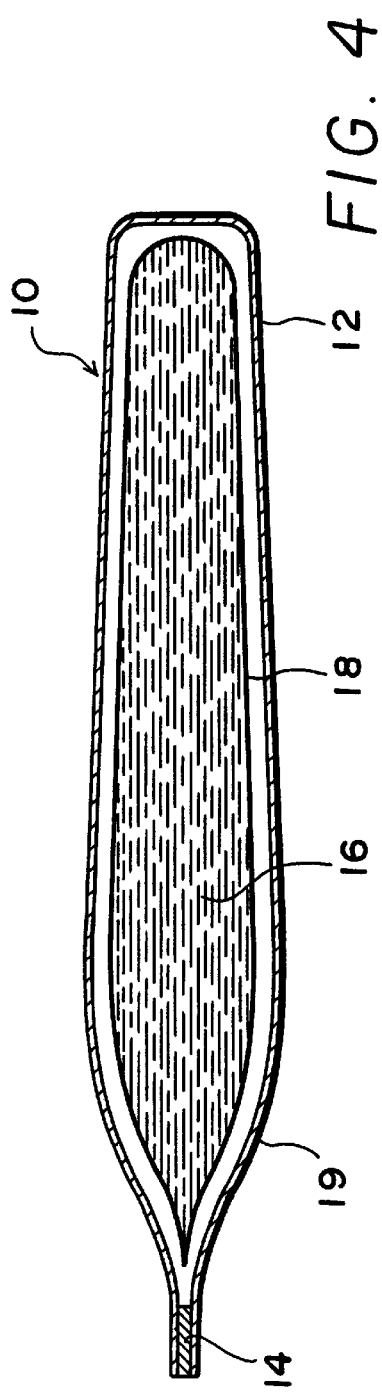
FIG. 3
FIG. 4

INTAKE COOLER

CROSS-REFERENCE TO RELATED APPLICATIONS

This U.S. Patent Application is based upon U.S. Provisional Patent Application Serial No. 60/141,889, filed Jul. 2, 1999, entitled "PLENUM COOLERS".

BACKGROUND OF THE INVENTION

1. Field of the Invention

The invention relates to a device for cooling the air intake of race cars. More particularly, the invention relates to a cooling device for the plenum cooperating with the intake manifold of engines in drag race vehicles for increasing the effective horsepower obtained from an internal combustion engine.

2. Description of the Prior Art

Many attempts have been made to cool the air flowing into the engine of vehicles, in particular racing vehicles, to increase the performance of the vehicle. For example, see U.S. Pat. No. 4,058,096 to Brown. In Brown a cooling chamber is mounted in communication with the air inlet portion of a carburetor.

While a wide variety of cooling devices and systems have been developed, a need continues to exist for unique low cost method of cooling the engines of drag racing vehicles between races to aid in obtaining greater or consistent performance during the course of a racing event. The present invention provides such a device.

SUMMARY OF THE INVENTION

It is, therefore, an object of the present invention to provide a device for cooling the plenum, or intake manifold, of an engine. The device includes a fireproof container filled with a frozen material, such as an ice pack, gel pak, or ice.

It is also an object of the present invention to provide a device wherein the container is a fireproof fabric bag with a hook and loop resealable closure.

It is another object of the present invention to provide bags of varying shapes and sizes to cover as much surface area of the plenum to obtain better cooling.

It is a further object of the present invention to provide a device wherein the ice pack is of a gel type pack which is re-freezable after its initial use.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 is a plan view of the present invention shown resting on top of a plenum.

FIG. 2 is a side view of the present invention shown resting on top of a plenum.

FIG. 3 is an plan view of the present cooling device showing the outer bag with the contents shown in dotted lines.

FIG. 4 is an side cut away view of the present invention.

DESCRIPTION OF THE PREFERRED EMBODIMENTS

The detailed embodiment of the present invention is disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIGS. 1–2, the cooling device 10 in accordance with the present invention is shown resting on top of an intake assembly 20. The intake assembly 20 includes a plenum section 22 having a top surface 24. An air entry, or throat section, 28 is shown at one end of the plenum 22. The intake assembly 20 further includes tubular runners 30 which extend to a ported manifold mounting plate 32 with ports 44 and a fuel injector rail 40. The intake assembly 20 is secured to the engine (not shown) by a mounting plate 32 and brackets 33. As such, the plenum generally is located on top of the engine. Since the plenum is located on top of the engine in a horizontal manner, it can easy support the cooling device 10 thereon.

With reference to FIGS. 3 and 4, the cooling device 10 includes an outer bag 12 made from a canvas material. The outer bag 12 is treated with flame or heat retardant chemicals to make the bag 12 fireproof. "Fireproof" as used herein is intended to indicate that the material will not burn when in contact with a metal surface 150 degrees Fahrenheit and higher for prolonged time periods. Various conventional flame retardant materials are well known, such as those disclosed in U.S. Pat. No. 4,898,757 to Maix. It is contemplated, however, that the outer bag could be made from various materials so long as the are flexible and permit the bag to come into contact with a large surface area of the intake assembly 20. The bag 12 includes a resealable closure 14, preferably of the hook and loop type, which permit repeated access to the inside of the bag 12. Enclosed within the bag 12 is frozen material 16 contained within a removable waterproof receptacle 18. It is also contemplated that the inside of bag 12 could be lined or coated with a water resistant material 19. The frozen material 16 may be ice, a re-freezable gel pack, dry ice, or a one time use, break to activate ice pak. The frozen material 16 is shown in dotted lines in FIG. 3.

In use, the frozen material 16 enclosed with in the waterproof receptacle 18 is placed within the bag 12. The bag 12 is then sealed at closure 14 and placed on top of the intake assembly 20 of a vehicle's engine which has been shut down after a race. The cooling device 10 cools the plenum and intake manifold to improve the operation thereof. Specifically, due to the cooling of the intake assembly 20 via the cooling device 10, the intake air is increased in density and oxygen content which in turn changes the air fuel ratio and results in increase performance or horsepower. The bag 12 is then removed prior to the vehicle's next race and the frozen material is removed from the bag 12 and re-frozen.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. An air intake cooling device comprising a fire retardant outer bag, a frozen material contained within the bag and a waterproof material separating the frozen material from the bag, wherein the bag is made from canvas thereby permitting air flow to and around the frozen material and the intake.

2. The cooling device according to claim 1, wherein the frozen material is contained within a waterproof receptacle.

3. The cooling device according to claim 1, wherein the frozen material is ice.

4. The cooling device according to claim 1, wherein the frozen material is a reusable gel pak.

5. The cooling device according to claim 1, wherein the frozen material is dry ice.

6. The cooling device according to claim 1, wherein the bag includes a resealable opening permitting removal and replacement of the frozen material.

7. A method of cooling an intake assembly of a vehicle comprising the steps of:

(a) placing frozen material enclosed within a waterproof receptacle into a fire retardant bag;

(b) sealing the fire retardant bag;

(c) placing the fire retardant bag containing the frozen material on the plenum of a vehicles intake assembly of a vehicle's engine which has been shut down after a race;

(d) permitting the fire retardant bag to remain in contact with the plenum for a length of time; and (e) removing the bag prior to the vehicle's next race.

\* \* \* \* \*